United States Patent [19]

Hillier

[11] 4,029,049

[45] June 14, 1977

[54] FISH BARRIER

[76] Inventor: Albert John Hillier, 1154 Old Baptist Road, North Kingstown, R.I. 02852

[22] Filed: Apr. 29, 1976

[21] Appl. No.: 681,733

[52] U.S. Cl. .................................. 119/3; 43/7; 61/21; 61/29; 61/1 R
[51] Int. Cl.² ................... A01K 61/00; E02B 8/08
[58] Field of Search ............ 61/29, 21, 1 R; 119/3; 43/7, 9

[56] References Cited

UNITED STATES PATENTS

| | | | |
|---|---|---|---|
| 437,202 | 9/1890 | Hockin | 61/21 |
| 1,515,547 | 11/1924 | Burkey | 119/3 |
| 1,585,483 | 5/1926 | Freer | 43/7 |
| 2,709,984 | 7/1955 | Marks | 119/3 |
| 2,810,229 | 10/1957 | Allyn | 119/3 X |
| 2,821,842 | 2/1958 | Christiansen | 61/29 |
| 3,091,934 | 6/1963 | Jacobs | 61/29 |

*Primary Examiner*—Dennis L. Taylor
*Attorney, Agent, or Firm*—Albert P. Davis

[57] ABSTRACT

A net blocking a stream or canal to prevent fish from traveling up the stream but permitting the normal flow of water and having a normally closed opening therein adapted to be opened by trash and debris carried by said water to permit said trash and debris to pass therethrough.

4 Claims, 8 Drawing Figures

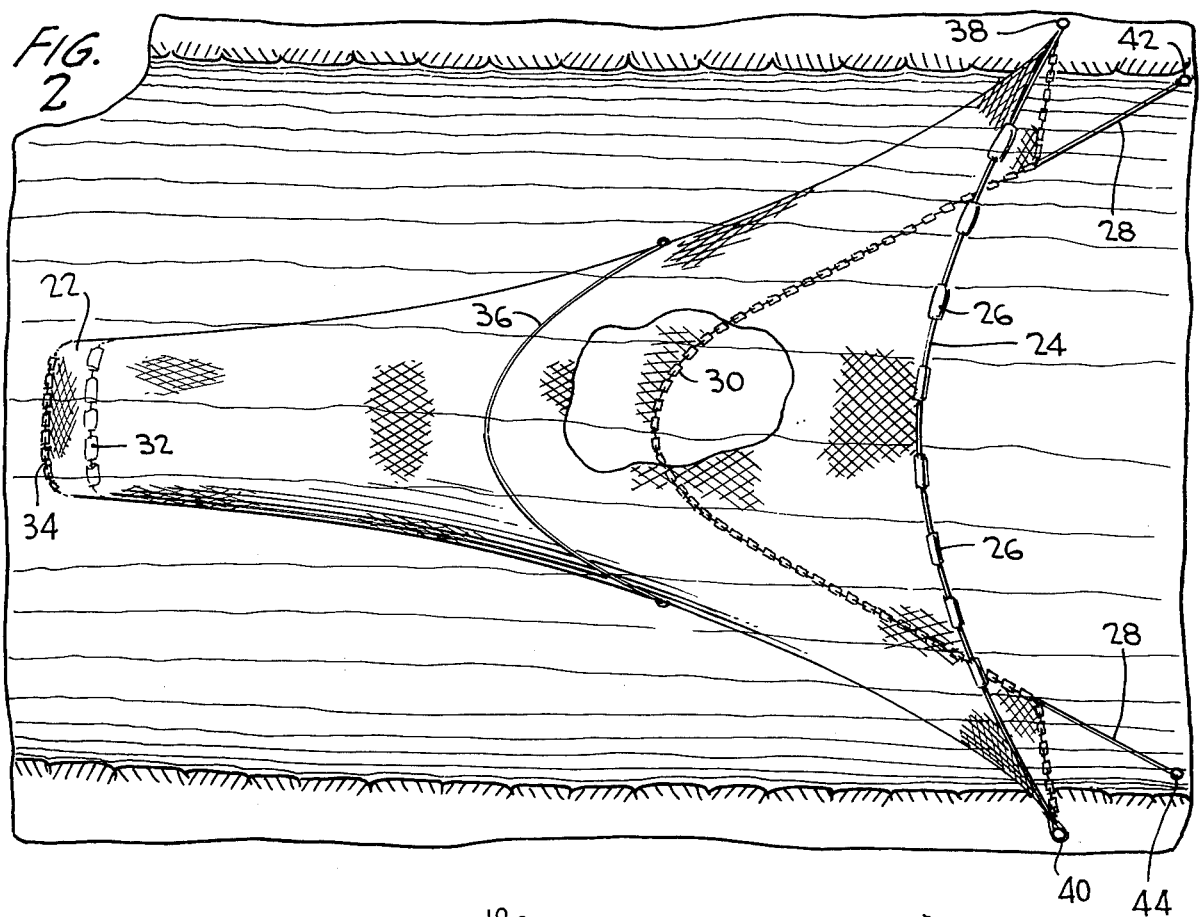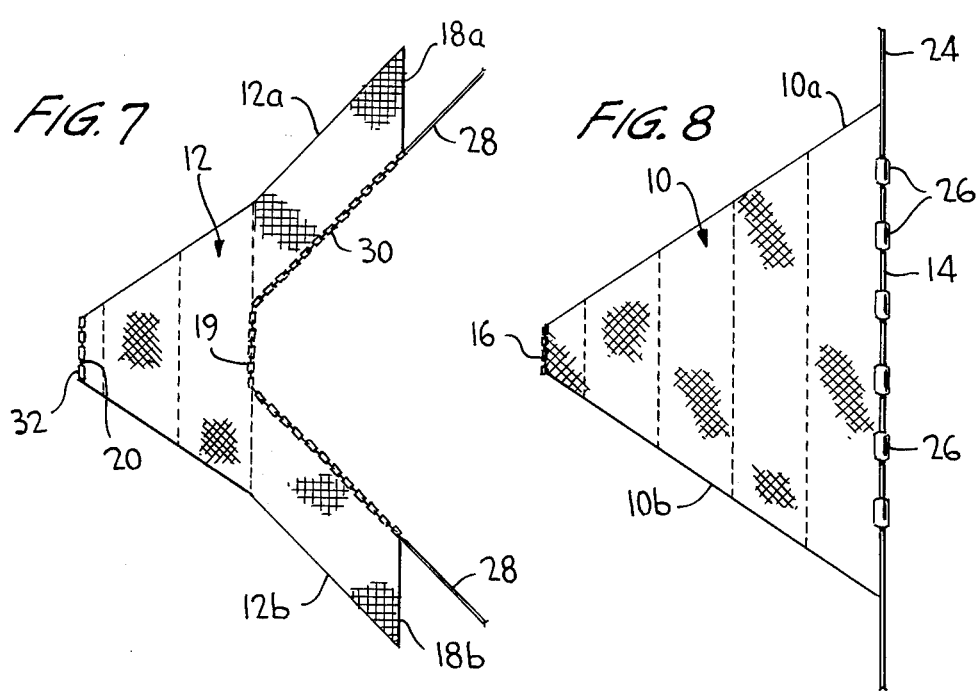

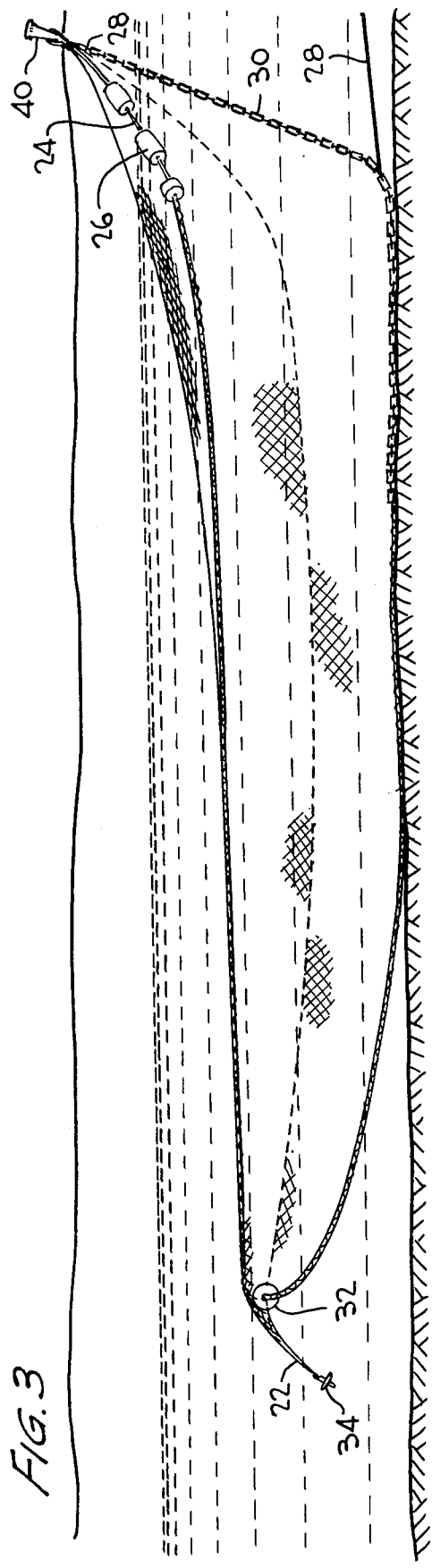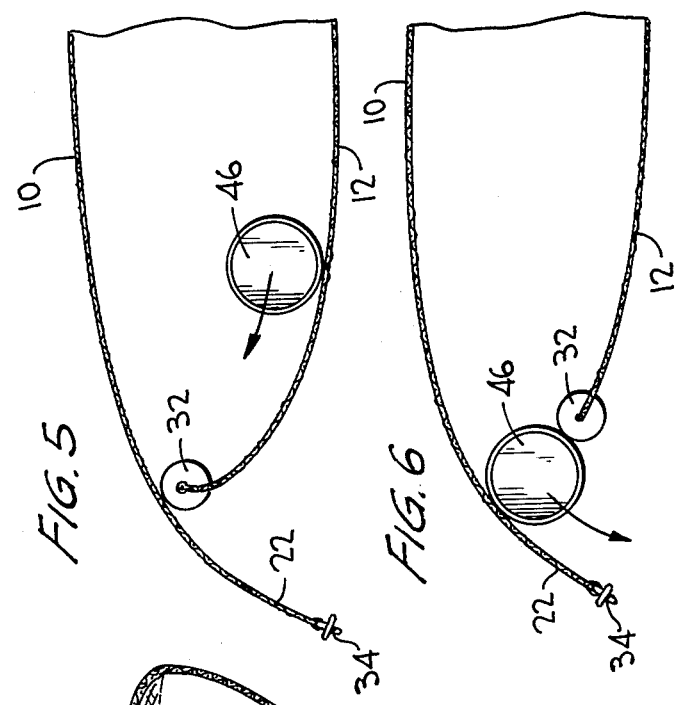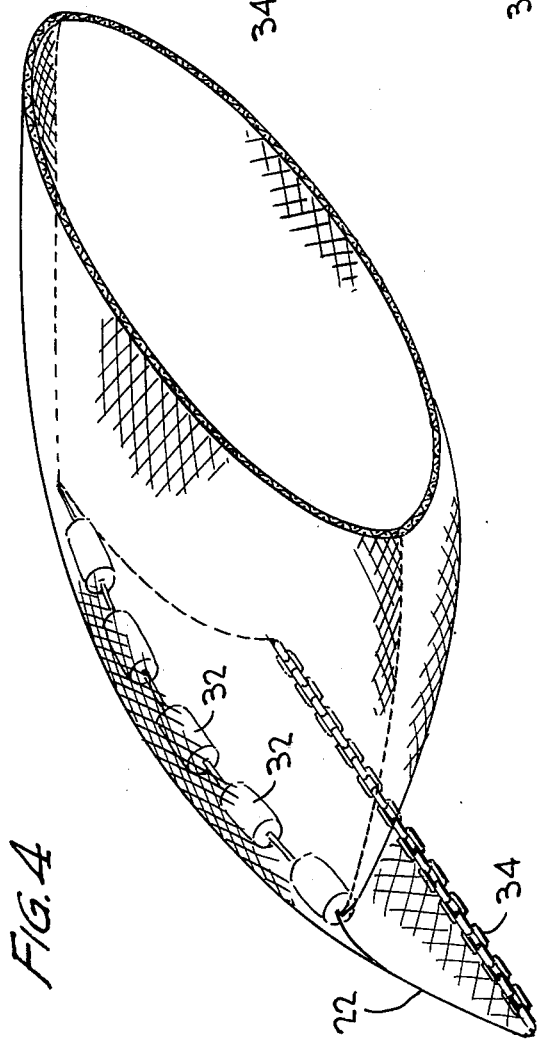

FISH BARRIER

BACKGROUND OF THE INVENTION

It frequently is necessary to prevent fish from passing up a stream or canal but at the same time not impede the flow of the stream or prevent solid objects from moving downstream. For example, it is common practice for industrial plants to use water from streams as cooling water in their heat exchangers. The water is drawn from the stream, is passed through the heat exchanger and is discharged downstream of the inlet. School fish, such as menhaden, will follow the warm discharge from the heat exchanger up the stream and if they are not stopped will clog the heat exchanger outlet. A net or screen placed across the stream is not a practical solution to the problem because debris and trash can not pass through such a barrier and the barrier will soon become clogged to the point where the stream will be effectively dammed and will overflow the barrier or the force and weight of the water will tear the barrier out. Previous attempts to solve this problem have involved moving screens in the form of moving belts or panels which pass the trash and debris around the end of the barrier. Such devices are expensive, require considerable maintenance and are often unable to pass large objects such as barriers, tree trunks, and the like.

SUMMARY OF THE INVENTION

The present invention comprises a generally tapered pocket shaped net having a mouth adapted to contact the sides and bottom of a stream. Said mouth also having a top portion adapted to be supported at or above the surface of said stream. The opposite end of the net is positioned downstream from the mouth and includes an opening in the form of a substantially horizontal slit. The lower edge of said opening has buoyant material fixed thereto to lift said lower edge upwardly. The upper edge of said slit has a depending flap fixed thereto. The lower edge of said flap has weight fixed thereto to a sink said lower edge. Said buoyant material and said weight normally hold the upper and lower edges of said slit together with said flap depending thereover. Trash and debris entering the barrier net are carried by the flowing water and guided by the converging net arrive at the opening. When such material is a large object, or when a sufficient quantity of small objects accumulates, the weight thereof and the pressure thereof will cause the normally closed opening to open to permit the object to pass through. As soon as the object or objects have left the barrier the opening closes.

It is an object of the present invention to provide a barrier which will effectively prevent the passage of fish up a stream but which will permit the unimpeded flow of water down the stream and which will permit trash and debris to pass therethrough.

Another object of the present invention is to provide such a barrier which is inexpensive, requires little maintenance and which can be positioned in or removed from a stream easily and quickly.

These and other objects of this invention will become more fully apparent with reference to the following specification and drawing which describe the preferred embodiment of the invention.

BRIEF DESCRIPTION OF THE DRAWING

FIG. 2 is a plan view, with parts broken away, of the fish barrier in place in a stream.

FIG. 3 is a side elevation of the fish barrier in place in a stream.

FIG. 4. is a fragmentary perspective view of the downstream end of the fish barrier.

FIG. 5 is a fragmentary cross sectional view of the downstream end of the fish barrier illustrating the normally closed opening in closed position.

FIG. 6 is a view similar to FIG. 5 but showing a barrel opening and passing through the normally closed opening.

FIG. 7 is a plan view of the netting which forms the lower portion of the fish barrier.

FIG. 8 is a plan view of the netting which forms the upper portion of the fish barrier.

DETAILED DESCRIPTION

Figure 1:
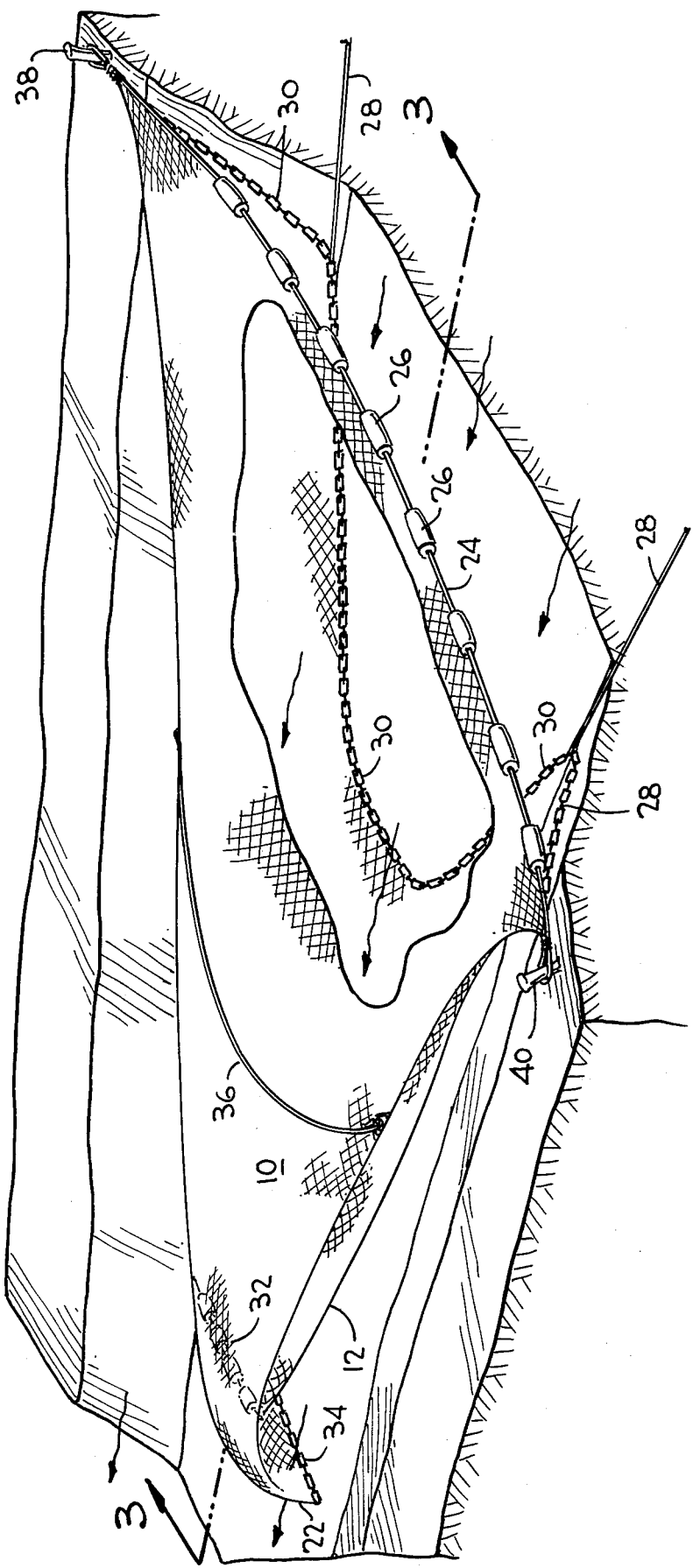
FIG. 1 is a perspective view, with parts broken away, of the fish barrier placed in a stream.

The fish barrier is made of standard commercial netting. Preferably the strands thereof are nylon and I have found that netting having a "straight mesh" of 2¾ inches is satisfactory in most instances. However, it will be understood that any convenient strand material can be used and the mesh size can be larger or smaller depending upon the size of fish to be excluded.

The preferred embodiment of the invention shown in the drawing is made from two panels of netting. An upper panel 10 and a lower panel 12, see FIGS. 8 and 7 respectively. Each said panel is made from 2¾ inch straight mesh netting. Panel 10 is 650 meshes wide across its upstream or mouth edge 14 and is 450 meshes long tapering from said upstream edge to its downstream edge 16 which is 50 meshes wide. Lower panel 12 is generally V-shaped. Each arm of the V comprises the wings of the net and each are 150 wide. Lower panel 12 is 425 meshes long from its upstream wing ends 18a and 18b to its downstream edge 20 which is 82 meshes wide. Netting is available in long strips which are 100 meshes wide. The panels disclosed in FIGS. 7 and 8 can be made by lacing together strips of 100 mesh netting and cutting the large sheet thus formed to appropriate shape. The two panels, however formed, are joined together to form a tapered tube of netting, which is open at its large upstream end and also at its small downstream end, by lacing the edges 10a and 12a together and the edges 10b and 12b together. The panels are thus laced together with the edges 14 and wing ends 18a and 18b adjacent. Inasmuch as panel 10 is 25 mesh longer than panel 12 a flap 22 which is 25 mesh long projects beyond the downstream edge 20 of lower panel 12.

The upstream edge 14 of panel 10 is secured to head rope 24 which also carries a plurality of spaced floats 26 thereon. A foot rope 28 is secured to the wing ends 18a and 18b, the inner edges of the wings and the edge 19 of the belly of panel 12. Foot roop 28 includes a length of chain 30 which is co-extensive with the wing ends, inner wing edges and the panel belly. A plurality of floats 32 are secured to the downstream edge 20 of panel 12 and a length of chain 34 is secured to the downstream edge 16 of panel 10. The ends of a lifting cable 36 are secured to the sides of the barrier net at its mid-point and serves as means for connecting the barrier to a hoisting device when the barrier is installed in or removed from a stream.

The barrier net is installed in a stream by lifting it into position by means of lifting cable 36 and securing head rope 24 to suitable anchoring means, for example posts 38 and 40 set in opposite sides of the stream. Foot rope 28 is secured to its own anchoring means 42 and 44, also set in opposite sides of the stream, as disclosed in FIG. 2.

When thus positioned in a stream the water flowing down the stream causes the net to stream with the flowing water. Tension in the head rope 24 and floats 26 holds the upstream or mouth end of panel 10 at or above the surface of the stream. The chain 30, forming a part of foot rope 28 causes the upstream or mouth end of panel 12 to contact and conform to the sides and bottom of the stream. The shape of panels 10 and 12 and the fact that the stream is wider than it is deep causes the opening in the downstream tapered end to assume a horizontal slit-like configuration. The floats 32 cause the downstream edge 20 of panel 12 to be lifted and the chain 34 causes the downstream edge of flap 22 to sink whereby said edge 20 is held against the underside of flap 22 to effectively close the opening in the downstream end of the barrier. It will be understood that the weight of chain 30 is selected to be sufficient to hold the mouth of the net on the bottom and sides of the stream against the pull exerted by the flowing water. It will also be understood that the buoyancy of floats 32 and the weight of chain 34 are such that the downstream opening is held closed against the force of the stream but will be opened by objects carried by the stream as will be explained in detail hereinafter.

Because of the large area of net involved in the fish barrier of the present invention the flow of water is not impeded. However, trash and natural debris such as leaves, branches, etc., if permitted to accumulate in the barrier will impede the streams flow. Due to the tapered shape of the barrier trash and debris will accumulate at its downstream end. When a sufficient quantity of small objects accumulate at, or a single object of sufficient size arrives at, said downstream end floats 32 and edge 20 of panel 12 are caused to sink and/or flap 22 and chain 34 are lifted to thereby provide an opening through which said trash or debris can pass. After the material has left the net floats 32 and edge 20 rise and/or flap 22 and chain 34 sink to once again close the opening. FIGS. 5 and 6 illustrate the manner in which the normally closed downstream opening functions.

FIG. 5 discloses a large object such as a barrel or tree trunk 46 moving down to the barrier net under the influence of the current. FIG. 6 illustrates the moment the object passes through the opening. Immediately thereafter floats 32 and edge 20 will rise. The object will continue downstream from under flap 22 following which said flap will drop to again close said opening.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A fish barrier comprising a generally tapered pocket shaped net adapted to extend across a stream to thereby prevent the passage of fish up said stream, said tapered pocket shaped net having a large end and a small end, said large end comprising an open mouth having opposed sides and a bottom adapted respectively to contact the sides and bottom of said stream and a top portion adapted to be supported across the surface of said stream, the small end of said net being adapted to be positioned downstream from said mouth and having an opening formed therein, said opening having an open and closed position, and means releasably holding said opening in its closed position, said opening being adapted to be opened by pressure from trash or debris carried by said stream and to be closed by said means after said trash or debris has passed therethrough.

2. A fish barrier as set forth in claim 1 wherein said opening is a horizontal slit having an upper edge and a lower edge and said means includes a float fixed to said lower edge.

3. A fish barrier as set forth in claim 2 wherein said means includes a weight fixed to the upper edge of said opening.

4. A fish barrier as set forth in claim 3 wherein said upper edge of said opening includes a flap adapted to depend over said lower edge.

* * * * *

UNITED STATES PATENT OFFICE
CERTIFICATE OF CORRECTION

PATENT NO. : 4,029,049
DATED : June 14, 1977
INVENTOR(S) : Albert John Hillier

It is certified that error appears in the above–identified patent and that said Letters Patent are hereby corrected as shown below:

Column 1, line 27, change "barriers" to barrels.

Signed and Sealed this

Eighteenth Day of October 1977

[SEAL]

Attest:

RUTH C. MASON
Attesting Officer

LUTRELLE F. PARKER
Acting Commissioner of Patents and Trademarks